(12) United States Patent
Tsai et al.

(10) Patent No.: US 8,792,446 B2
(45) Date of Patent: Jul. 29, 2014

(54) COMMUNICATION METHOD OF COORDINATED MULTI-POINT TRANSMISSION SYSTEMS

(75) Inventors: Yuh-Ren Tsai, Hsinchu (TW); Hao Yun Huang, Hsinchu (TW); Chin-Liang Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 192 days.

(21) Appl. No.: 13/527,973

(22) Filed: Jun. 20, 2012

(65) Prior Publication Data

US 2013/0195024 A1    Aug. 1, 2013

(30) Foreign Application Priority Data

Jan. 31, 2012  (TW) .............................. 101103166 A

(51) Int. Cl.
*H04W 4/00*     (2009.01)

(52) U.S. Cl.
USPC ........... 370/329; 370/328; 370/252; 370/260; 370/267

(58) Field of Classification Search
USPC ......... 370/329, 328, 252, 260, 267, 208, 338, 370/203, 210, 480, 343, 330, 312, 315, 331, 370/344, 225, 230, 241; 375/260, 267, 346, 375/295, 299, 219, 316, 347, 148; 455/562.1, 101
See application file for complete search history.

(56) References Cited

U.S. PATENT DOCUMENTS

| 2011/0122789 A1* | 5/2011 | Haustein et al. ............... 370/252 |
| 2013/0201913 A1* | 8/2013 | Niemela ....................... 370/328 |

* cited by examiner

*Primary Examiner* — Christopher Grey
*Assistant Examiner* — Oussama Roudani
(74) *Attorney, Agent, or Firm* — Wang Law Firm, Inc.; Li K. Wang; Stephen Hsu

(57) ABSTRACT

A communication method of coordinated multi-point transmission systems. Based on the Zadoff-Chu sequences, multiple training sequences are implemented, and the training sequences are a set of robust orthogonal training sequence (ROTS). Preamble signals that use the set of training sequences can be transmitted from multiple base stations/relay stations at the same time. In the case with the mixture signal of multiple preamble signals, user equipment can still use the received signal to estimate multiple carrier frequency offsets of the corresponding base stations/relay stations.

8 Claims, 7 Drawing Sheets

COMMUNICATION METHOD OF COORDINATED MULTI-POINT TRANSMISSION SYSTEMS

CROSS-REFERENCE TO RELATED APPLICATION

This application claims the benefit of Taiwan Patent Application No. 101103166, filed on Jan. 31, 2012, in the Taiwan Intellectual Property Office, the disclosure of which is incorporated herein in its entirety by reference.

FIELD OF THE INVENTION

The present invention relates to a communication method of coordinated multi-point transmission systems, in particular to the communication method that multiple base stations transmit preamble signals to facilitate the estimation of multiple carrier frequency offsets (CFOs) at a user device, where the preamble signals correspond to a set of orthogonal training sequences that can reduce the interference from the preamble signals transmitted by other base stations.

BACKGROUND OF THE INVENTION

Orthogonal frequency division multiplexing (OFDM) is an effective solution for high data rate services because of its high bandwidth efficiency and resistance to multipath fading. In order to prevent inter-carrier interference, precise frequency synchronization between the transmitter and receiver is essential and crucial; hence, CFO estimation is an important and necessary technology for OFDM systems. By transmitting known training sequences, a receiver can estimate the CFO value based on the received signals. Then, the receiver can adjust the local oscillator to compensate the carrier frequency offset.

In a coordinated multi-point (CoMP) transmission system, multiple base stations or relay stations can simultaneously transmit the same information to user equipment (UE) to improve radio coverage and overall system performance. A UE will receive and demodulate the signals transmitted from different base stations, and different received signals may have different values of CFO. Under the scenario applying CoMP transmission, a receiver must estimate multiple CFOs corresponding to the multiple received signals for compensation. Because different signals interfere with each other at a receiver, the mutual interference significantly degrades the CFO estimation performance. Hence, the conventional frequency offset estimation technology which emphasizes on single-CFO estimation is not suitable for multi-CFO estimation in CoMP-OFDM systems. So, it becomes an important issue on how to estimate multiple carrier frequency offsets simultaneously.

Technically, designing a communication method that allows a UE to be able to estimate multiple CFOs corresponding to the multiple receiving signals from different base stations in coordinated multi-point transmission systems is necessary and becomes an important issue for future fourth generation wireless communication systems.

SUMMARY OF THE INVENTION

In view of the shortcomings of the prior art, the primary objective of the present invention is to provide a communication method of coordinated multi-point transmission systems that can overcome the problems of the prior art.

To achieve the aforementioned objective, the present invention provides a communication method of coordinated multi-point transmission systems for estimating multiple carrier frequency offsets, and the communication method comprises the steps of: selecting a Zadoff-Chu sequence as the primitive training sequence; generating a set of orthogonal training sequences according to the primitive training sequence gone through with a set of cyclic shifts; allocating the set of orthogonal training sequences to multiple involving base stations; transmitting multiple preamble signals corresponding to the set of orthogonal training sequences from multiple base stations to a UE by a coordinated multi-point (CoMP) transmission method; and using a UE to receive a mixture signal of the multiple preamble signals.

Wherein, the set of orthogonal training sequences comply with the relations of $$\langle MD_k \rangle_N \approx \frac{(k-1)N}{K},$$

and $2 \leq k \leq K$; wherein, $\langle MD_k \rangle_N$ substantially approaches to $$\frac{(k-1)N}{K};$$

and N is the length of the orthogonal training sequence, $\langle \Box \rangle_N$ is the modulo-N operator, M is a positive integer parameter of the Zadoff-Chu sequence and relatively prime to N, k is a positive integer, K is the number of involving base stations, and $\approx$ is a "relatively equal" sign indicating an approximation within a range.

Wherein, the multiple orthogonal training sequences installed in the multiple involving base stations is a subset of a set of orthogonal training sequences in compliance with the relations.

Wherein, the communication method of coordinated multi-point transmission systems further comprises the steps of simultaneously receiving the multiple preamble signals corresponding to the multiple orthogonal training sequences transmitted by multiple involving base stations; estimating the CFO value and the channel gain corresponding to the signal transmitted from one of the multiple base stations according to the received mixture signal from the multiple preamble signals; calculating the estimate of the received signal transmitted from one of the multiple base stations according to the estimates of the CFO values and the channel gains; calculating updated estimates of the CFO value and the channel gain corresponding to the signal transmitted by one of the multiple base stations based on the estimate of the received signal, and increasing the iteration number by 1; stopping the calculation, if the iteration number is equal to a predetermined value; and adjusting the local frequency of a receiver to compensate the carrier frequency offset according to the CFO estimate.

Wherein, the method further comprises the step of calculating the estimate of a received signal transmitted from one of the multiple base stations according to the estimates of the corresponding CFO value and channel gain.

Wherein, the method further comprises the step of estimating the CFO value and the channel gain corresponding to the signal transmitted from one of the multiple base stations by using the maximum likelihood estimator.

In summation, the present invention has one or more of the following advantages:

(1) The communication method of coordinated multi-point transmission systems of the present invention can use the Zadoff-Chu sequence as a primitive training sequence to design the best and most robust set of training sequences for the use by multiple base stations.

(2) The communication method of coordinated multi-point transmission systems of the present invention can transmit the preamble signals from multiple base stations at the same time. Even in the situation with multiple mixed preamble signals, a UE can still estimate the multiple CFOs according to the received mixture signal.

(3) The communication method of coordinated multi-point transmission systems of the present invention can still achieve a very good estimation performance, even when different preamble signals have different relative timing offsets, have different frequency offsets and/or experience different channel effects.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings not necessarily drawn according to the actual scale or exact precision, since the drawings are provided for the purpose of illustrating the invention and complementing the description of the specification, but not intended for limiting the scope of the invention.

Figure 1:
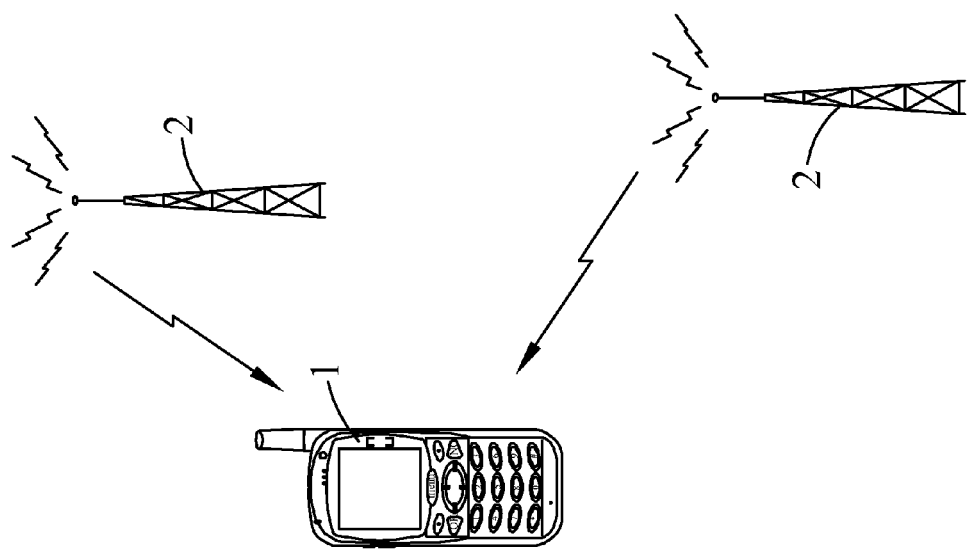
FIG. 1 is a first schematic view of a coordinated multi-point transmission system in accordance with a first preferred embodiment of the present invention.
Figure 1:
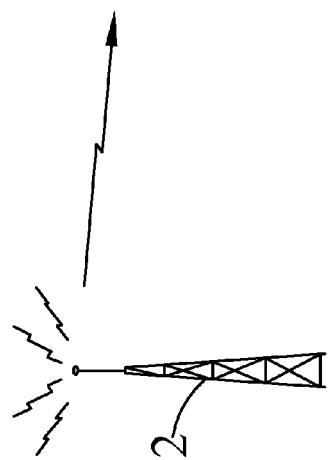

With reference to FIG. 1 for a first schematic view of a coordinated multi-point transmission system in accordance with the first preferred embodiment of the present invention, a base station 2 can transmit a signal to a UE 1 through a coordinated multi-point (CoMP) transmission method, and the UE 1 can receive a combination of signals from several different base stations 2. In this preferred embodiment, the Zadoff-Chu sequence serves as a basis of the training sequences, and the Zadoff-Chu sequence can be expressed by $Z=[Z[0], \ldots, Z[N-1]]^T$, an element of the sequence $Z[i]$, $i=0, \ldots, (N-1)$ is defined as $Z[i]=\exp(jM\pi i^2/N)$. Wherein, N is the length of the training sequence, M is a positive integer parameter of the Zadoff-Chu sequence and relatively prime to N.

Figure 2:
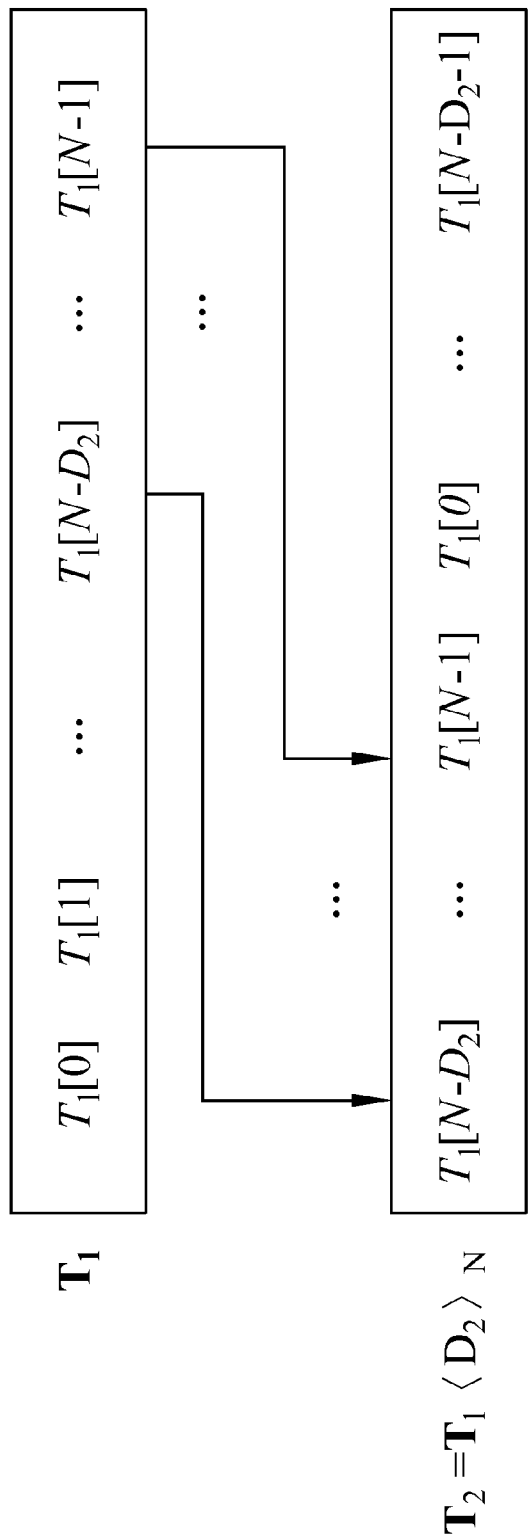
FIG. 2 is a second schematic view of a coordinated multi-point transmission system in accordance with the first preferred embodiment of the present invention.

With reference to FIG. 2 for a second schematic view of a coordinated multi-point transmission system in accordance with the first preferred embodiment of the present invention, the relation between two training sequences is shown in FIG. 2. Let $T_1=Z$ be a primitive training sequence, $T_2$ is an orthogonal training sequence produced by a cyclic shift $D_2$ samples of the primitive training sequence $T_1$. In other words, the set of K orthogonal training sequence for K base stations can be represented by $S=\{T_1, T_2, \ldots, T_K\}$, and the $k^{th}$ orthogonal training sequence can be defined as $T_k=Z_{D_k}=[Z[N-D_k], \ldots, Z[N-D_k-1]]^T$, and $1 \leq k \leq K$.

Wherein, $Z_{D_k}=[Z[N-D_k], \ldots, Z[N-D_k-1]]^T$ is a circular-shifting version of Z by right-shifting $D_k$ samples, and $1 \leq D_k \leq N-1$.

Therefore, the set of robust orthogonal training sequences (ROTS) of the present invention corresponds to the set of cyclic shifts $D=\{D_2, \ldots, D_K\}$, where the cyclic shifts are relative to the primitive training sequence $T_1$. The optimal relative circular-shift set $D=\{D_2, \ldots, D_K\}$ follows $$\langle MD_k \rangle_N \approx \frac{(k-1)N}{K},$$

for $2 \leq k \leq K$.

The aforementioned settings of the robust orthogonal training sequences (ROTS) can be used to minimize the mutual interference under the conditions that the different preamble signals transmitted from different base stations have different relative timing offsets, have different frequency offsets and/or experience different channel effects. Therefore, the multiple base stations can simultaneously transmit the preamble signals to a UE for CFO estimation by coordinated multi-point (CoMP) transmission.

Even though the concept of the communication method of coordinated multi-point transmission systems has been described in the section of the coordinated multi-point transmission system of the present invention, but the following flow chart is provided for illustrating the concept clearly.

Figure 3:
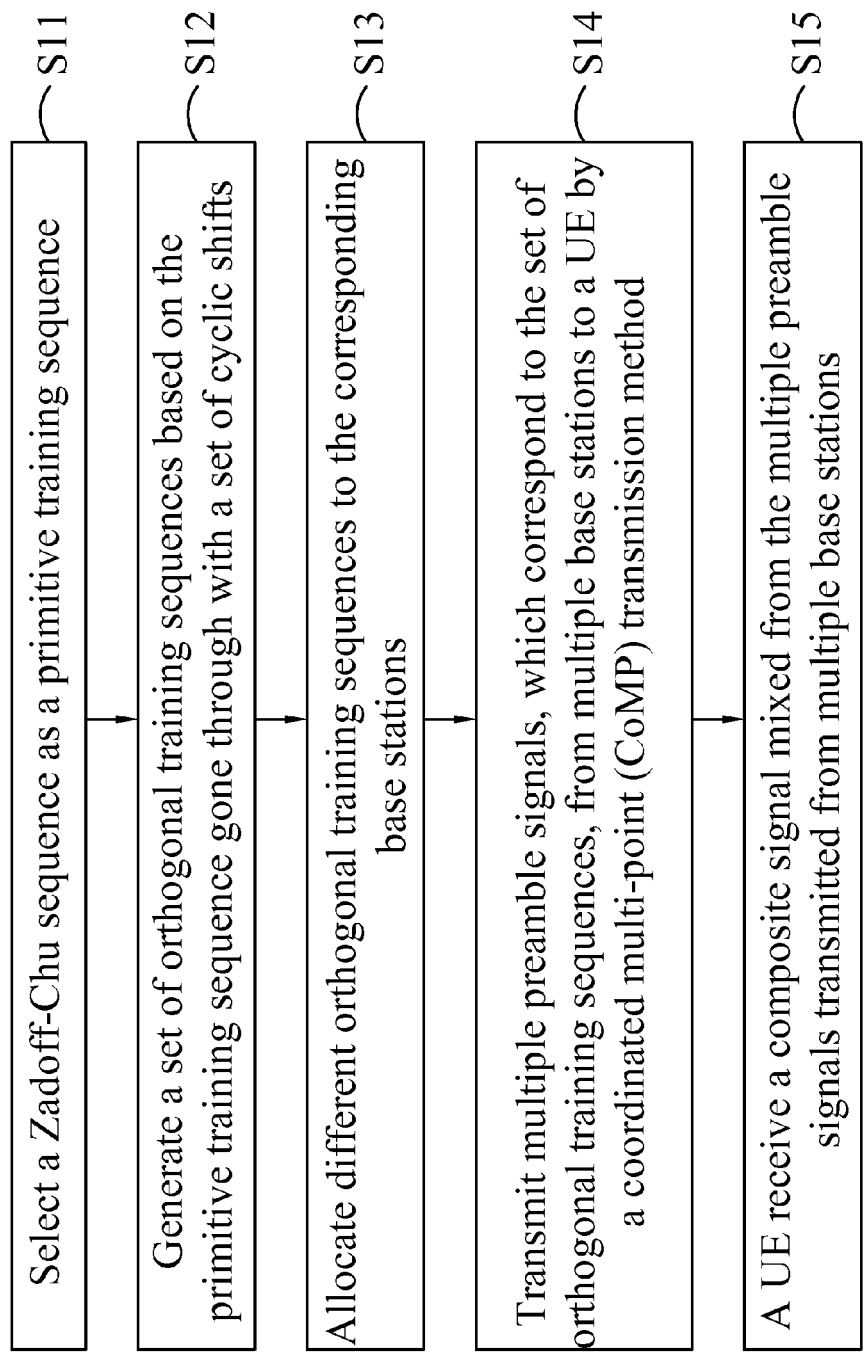
FIG. 3 is a first flow chart of a communication method of coordinated multi-point transmission systems in accordance with the present invention.

With reference to FIG. 3 for a first flow chart of a communication method of coordinated multi-point transmission systems in accordance with the present invention, the communication comprises the following steps:

S11: Select a Zadoff-Chu sequence as a primitive training sequence.

S12: Generate a set of orthogonal training sequences based on the primitive training sequence gone through with a set of cyclic shifts.

S13: Allocate different orthogonal training sequences to the corresponding base stations.

S14: Transmit multiple preamble signals, which correspond to the set of orthogonal training sequences, from multiple base stations to a UE by a coordinated multi-point (CoMP) transmission method.

S15: A UE receive a composite signal mixed from the multiple preamble signals transmitted from multiple base stations.

Figure 4:
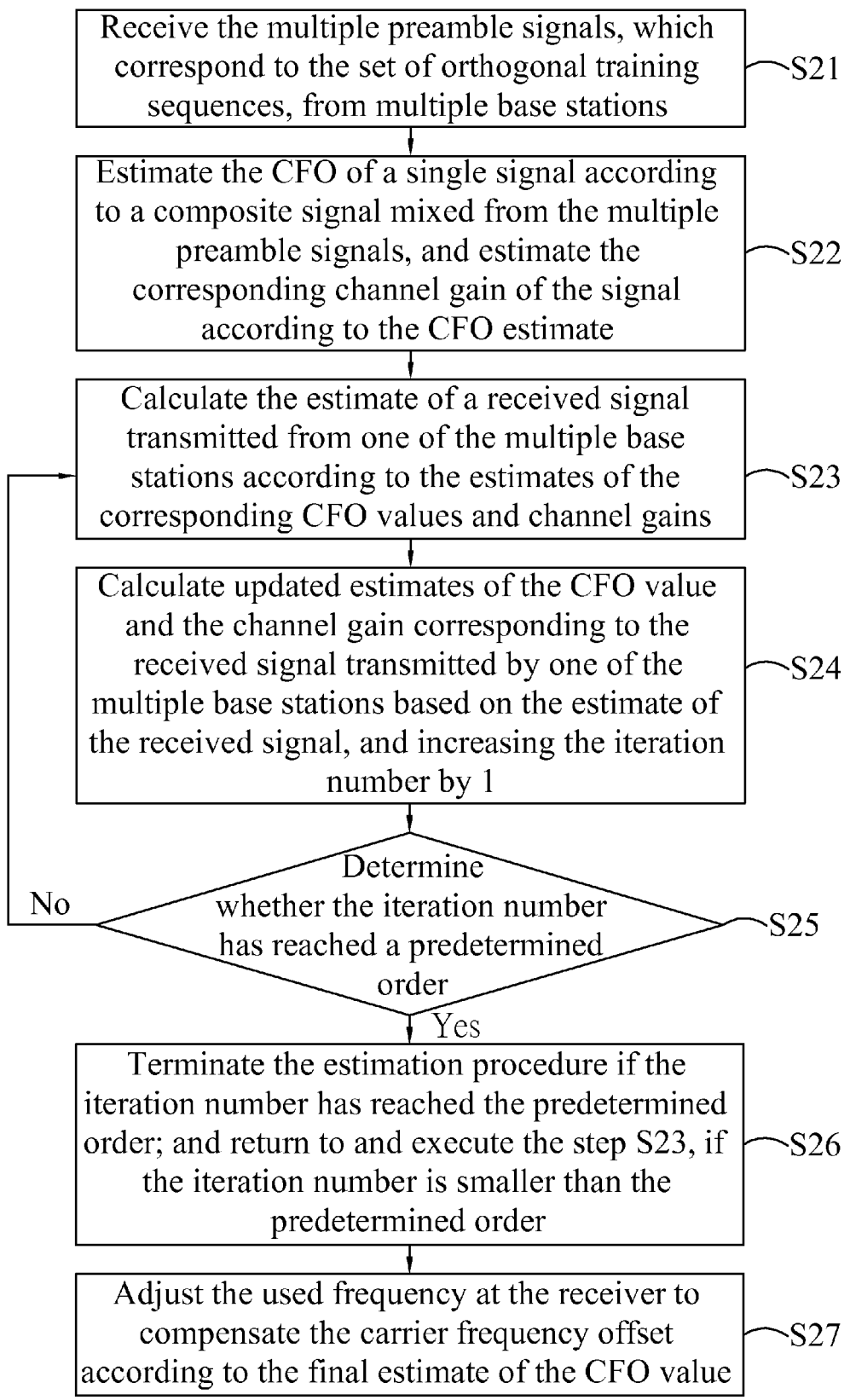
FIG. 4 is a second flow chart of a communication method of coordinated multi-point transmission systems in accordance with the present invention.

With reference to FIG. 4 for a second flow chart of a communication method of coordinated multi-point transmission systems in accordance with the present invention, the communication method comprises the following steps:

S21: Receive the multiple preamble signals, which correspond to the set of orthogonal training sequences, from multiple base stations.

S22: Estimate the CFO of a single signal according to a composite signal mixed from the multiple preamble signals, and estimate the corresponding channel gain of the signal according to the CFO estimate.

S23: Calculate the estimate of a received signal transmitted from one of the multiple base stations according to the estimates of the corresponding CFO values and channel gains.

S24: Calculate updated estimates of the CFO value and the channel gain corresponding to the received signal transmitted by one of the multiple base stations based on the estimate of the received signal, and increasing the iteration number by 1.

S25: Determine whether the iteration number has reached a predetermined order.

S26: Terminate the estimation procedure if the iteration number has reached the predetermined order; and return to and execute the step S23, if the iteration number is smaller than the predetermined order.

S27: Adjust the used frequency at the receiver to compensate the carrier frequency offset according to the final estimate of the CFO value.

The received time-domain signals from the K base stations can be expressed in a discrete form as $$y[i] = \sum_{k=1}^{K} \exp\left(\frac{j2\pi i w_k}{N}\right) \sum_{l=0}^{L_k-1} h_{k,l} x_k[i-l-\mu_k] + v[i],$$

and $0 \le i \le N-1$; wherein, $x_k[i]$ is the signal transmitted from the $k^{th}$ base station for $1 \le k \le K$; $w_k$ is the corresponding residual CFO normalized to the carrier spacing; $L_k$ is the channel length; $h_{k,l}$, for $1 \le k \le K$ and $0 \le l \le L_k-1$ are the channel coefficients; $\mu_k$ is the integer-valued timing error of the received signal; and $v[i]$ is the received zero mean additive white Gaussian noise.

The time-domain composite signal of the mixed multiple preamble signals received by a UE is represented in a discrete vector form as $$y = [y[0], \ldots, y[N-1]]^T = \sum_{k=1}^{K} \Phi_k A_k h_k + v,$$

wherein, $\Phi_k$ is the phase rotation matrix related to $w_k$, $A_k$ is the preamble signal matrix, v is the channel noise vector, and T denotes the matrix transposition.

The maximum likelihood estimator for the CFO of a signal transmitted from the $k^{th}$ base station can be represented by $$\hat{w}_k = \arg\max_{w_k} \{y^H \Phi_k A_k A_k^H \Phi_k^H y\},$$

and the corresponding channel gain estimator can be represented by $\hat{h}_k = (A_k^H \hat{\Phi}_k^H y)^T/N$; wherein, $\Phi_k$ is the phase rotation matrix related to $w_k$, $\hat{\Phi}_k$ is the matrix by substituting $\hat{w}_k$ into $\Phi_k$, and $A_k$ is the preamble signal matrix, N is the length of the preamble sequence, H denotes the conjugate transposition, and T denotes the matrix transposition.

In the first iteration, the estimates of the CFO $\hat{w}_k$ and the corresponding channel gain $\hat{h}_k$, for k=1, ..., K, are used as the initial estimation $\hat{w}_k^{(0)}$ and $\hat{h}_k^{(0)}$. According to the $i^{th}$ estimation results, $\hat{w}_k^{(i)}$ and $\hat{h}_k^{(i)}$, for $1 \le k \le K$, the estimate of the received signal transmitted from the $k^{th}$ base station is given by $$\hat{y}_k^{(i)} = y - \sum_{m=1, m \ne k}^{K} \hat{\Phi}_m^{(i)} A_m \hat{h}_m^{(i)},$$

for $1 \le k \le K$.

Based on the estimates of the individual signals transmitted from multiple base stations, the mutual interference can be partially eliminated, and the estimates of the CFO and the channel gain can be updated according to the signal estimation $\hat{y}_k^{(i)}$. The updated estimate of the CFO is $$\hat{w}_k^{(i+1)} = \arg\max_{w_k} \{(\hat{y}_k^{(i)})^H \Phi_k A_k A_k^H \Phi_k^H \hat{y}_k^{(i)}\};$$

and the updated estimate of the corresponding channel gain can be represented by $\hat{h}_k^{(i+1)} = (A_k^H (\hat{\Phi}_k^{(i+1)})^H \hat{y}_k^{(i)})^T/N$.

In the meantime, the maximum iteration number is set to $\eta$. If i<$\eta$, then the estimate of the received signal $\hat{y}_k^{(i)}$ transmitted from the $k^{th}$ base station and the updated estimates of the CFO and channel gain are calculated. If i is equal to or greater than $\eta$, the estimation procedure will be terminated.

Figure 5A:
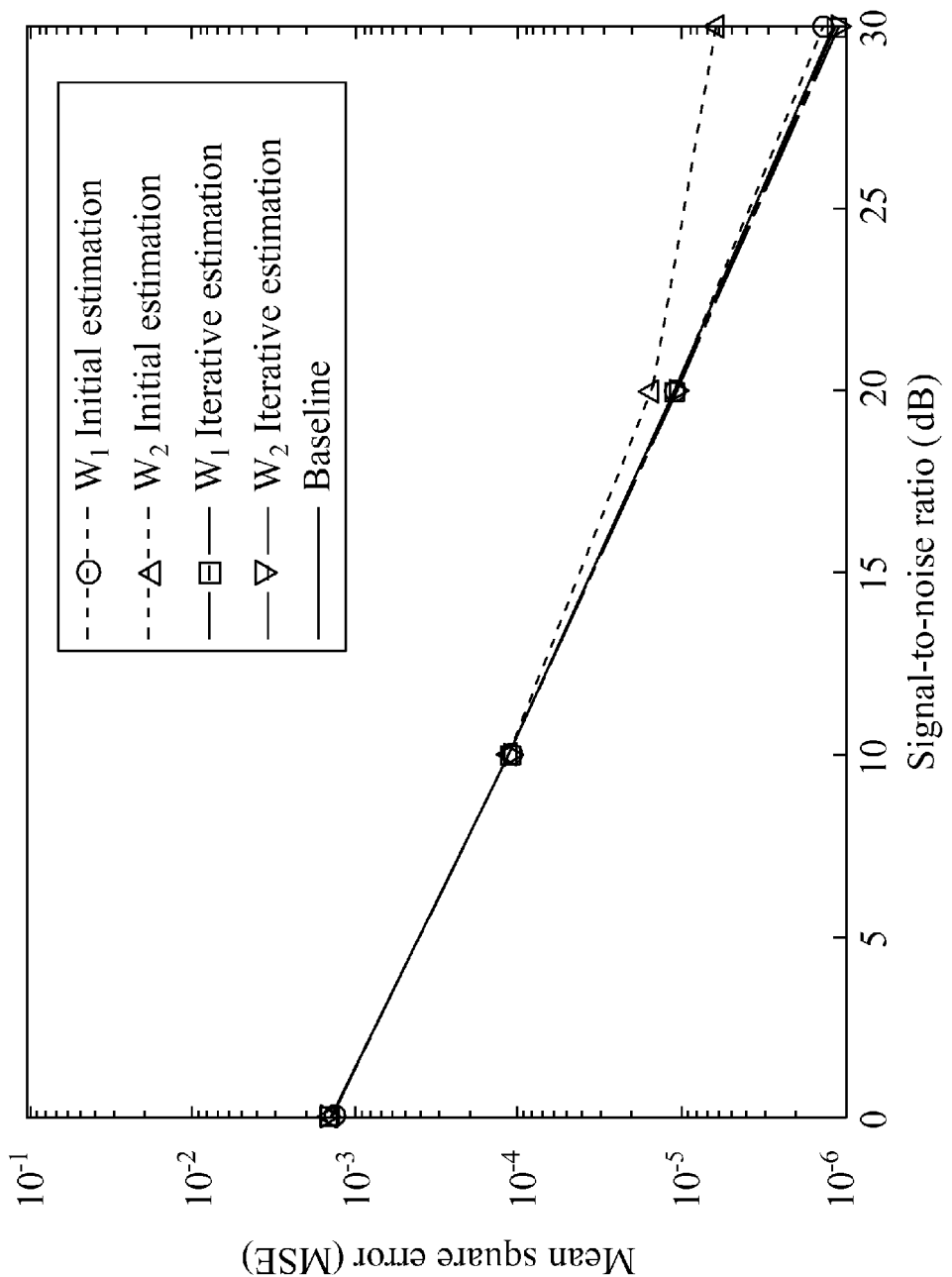
FIG. 5A is a first schematic view of a coordinated multi-point transmission system in accordance with a second preferred embodiment of the present invention.
Figure 5B:
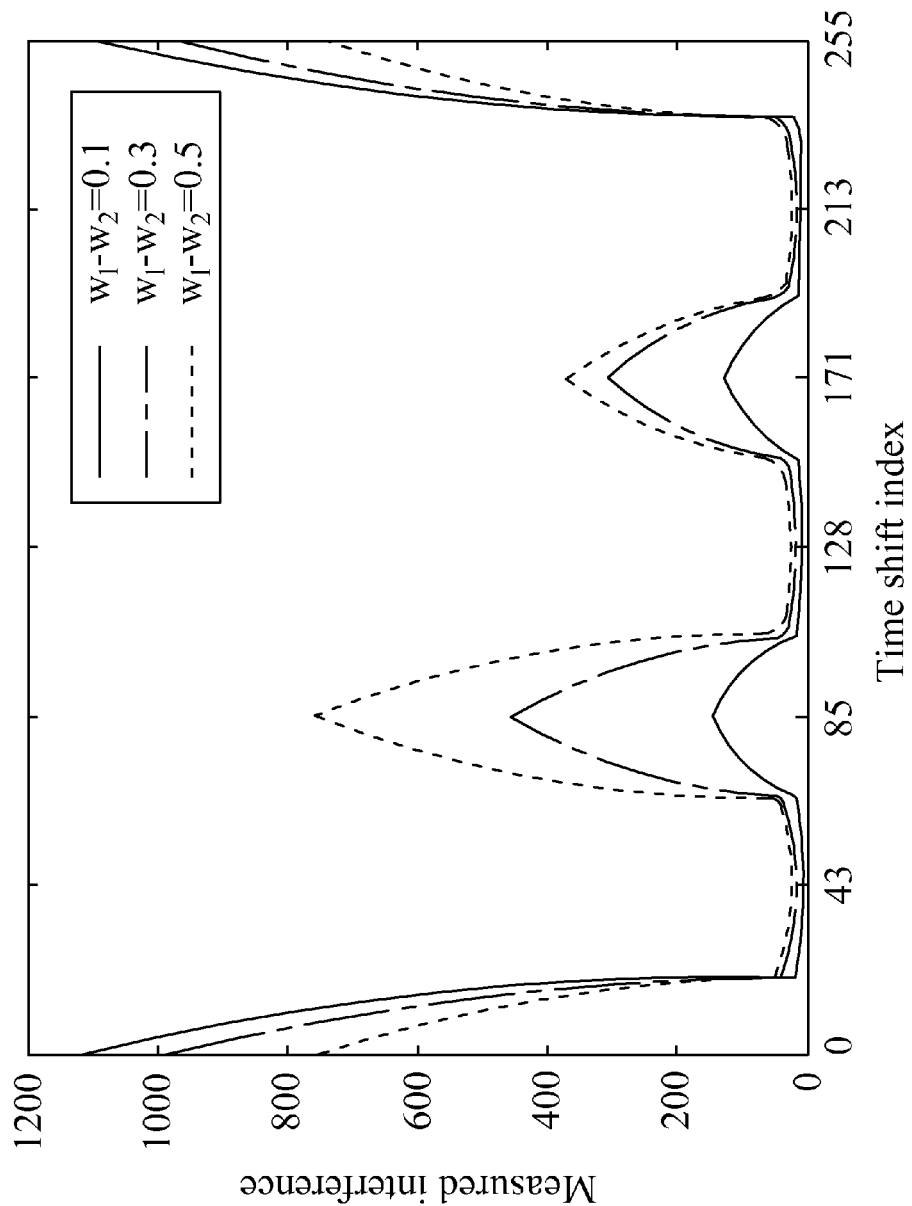
FIG. 5B is a second schematic view of a coordinated multi-point transmission system in accordance with the second preferred embodiment of the present invention.

With reference to FIG. 5A and FIG. 5B for the first and second schematic views of a coordinated multi-point transmission system in accordance with the second preferred embodiment of the present invention respectively. FIG. 5A shows the mean square error (MSE) performance versus the signal-to-noise ratio (SNR) under the scenario with two base stations, i.e., K=2. To clarify the technical characteristics of the present invention, two base stations are used in this preferred embodiment, but the invention is not limited to such arrangement only. In this preferred embodiment, the parameter settings are K=2, M=3, N=256 and $D_2$=43, and the CFOs of the signals transmitted from the two base stations are $w_1$=0.2 and $w_2$=−0.2. In FIG. 5A, even though the signal-to-interference ratio (SIR) is 0 dB between the two preamble signals transmitted from the two base stations, the estimation performance still approaches the baseline which is the performance of no interference when only a single base station is involved. In other word, the present invention can eliminate mutual interference of signals between different base stations effectively.

The measure of the mutual interference versus the time shift index for K=2, M=3, and N=256 for different values of CFOs is show in FIG. 5B. For M=3 and N=256, the optimal circular shift values proposed by the robust orthogonal training sequence (ROTS) of the present invention is $D_2$=43, 128 or 213 and the measure of the mutual interference drops significantly at the optimal circular shift values. In other words, the present invention can effectively eliminate the mutual interference between signals transmitted from different base stations.

It is noteworthy to point out that the performance of CFO estimation is almost the same as that of the baseline when the communication method of the present invention adopts the iterative approach to eliminate mutual interferences.

Figure 6:
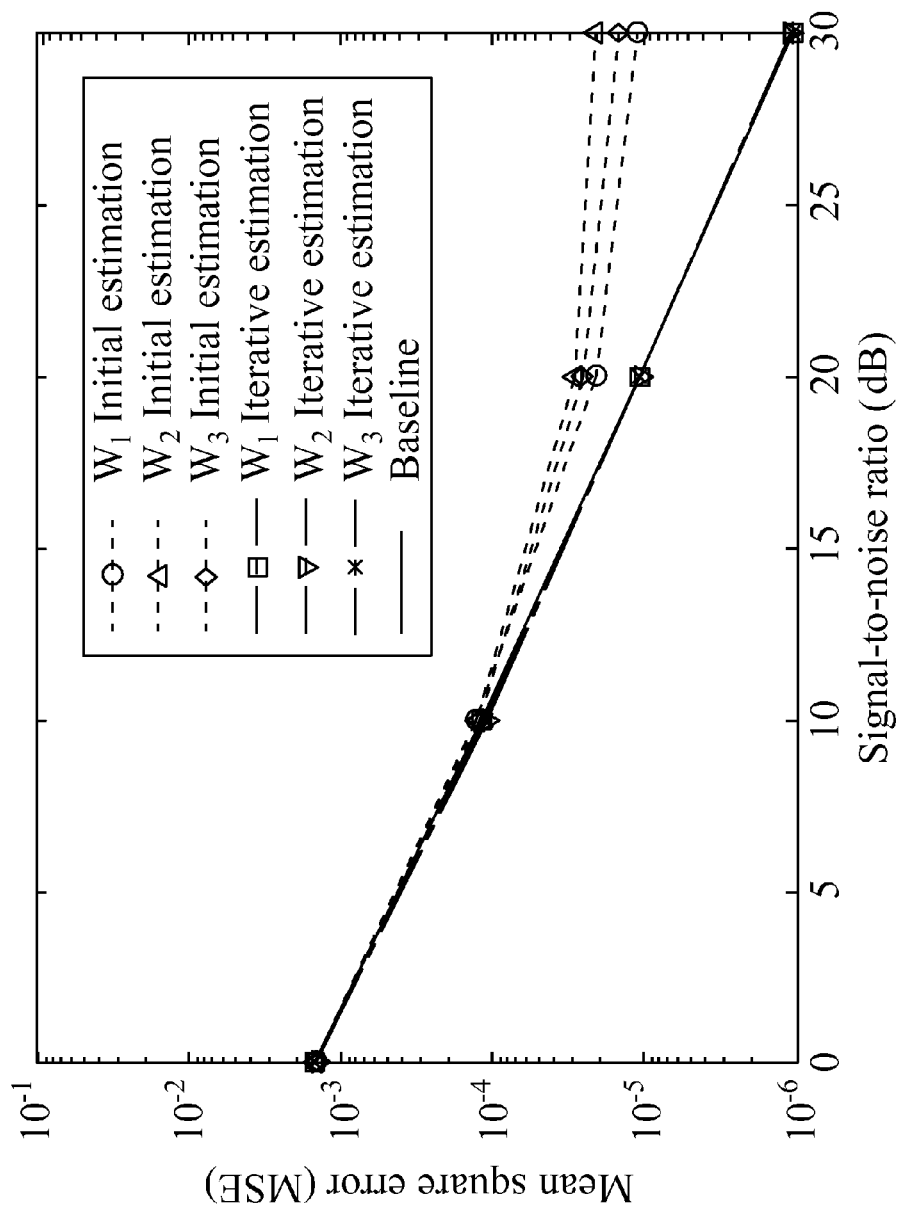
FIG. 6 is a schematic view of a coordinated multi-point transmission system in accordance with a third preferred embodiment of the present invention.

With reference to FIG. 6 for a schematic view of a coordinated multi-point transmission system in accordance with the third preferred embodiment of the present invention. FIG. 6 shows the MSE performance versus the SNR under the scenario with three BSs. To clarify the technical characteristics of the present invention, three base stations are used in this preferred embodiment, but the invention is not limited to such arrangement only. In this preferred embodiment, the parameter settings are K=3, M=3, N=256, $D_2$=28 and $D_3$=57, and the CFOs of the signals transmitted from the three BSs are $w_1$=0.3, $w_2$=0.1 and $w_3$=−0.2. When the signal-to-interference ratio (SIR) is −3 dB for the scenario with three base stations, the estimation performance still performs very well. In a normal operation area, i.e., SNR≤15 dB, the estimation performance is still very close to the baseline. In other words, the present invention can effectively eliminate mutual inferences.

In summary of the above description, the communication method of coordinated multi-point transmission systems in accordance with the present invention focuses on the estimation of multiple CFOs, and uses the Zadoff-Chu sequence as a primitive training sequence to design a set of robust orthogonal training signals which can minimize mutual interference; so that the training sequences can be transmitted from different base stations at the same time. Under the condition of receiving the mixture signal of multiple preamble signals, a UE can still estimate the multiple CFOs simultaneously. Even when the received signals which are transmitted from multiple base stations have different relative timing offsets, have different frequency offsets and/or experience different channel effects, the present invention still has a very good estimation performance.

What is claimed is:

1. A communication method of coordinated multi-point transmission systems, comprising the steps of:
    selecting a Zadoff-Chu sequence as a primitive training sequence;
    generating a set of orthogonal training sequences according to the primitive training sequence gone through with a set of cyclic shifts;
    allocating the set of orthogonal training sequences to multiple involving base stations;
    transmitting multiple preamble signals corresponding to the set of orthogonal training sequences from multiple base stations to a user equipment (UE) by a coordinated multi-point (CoMP) transmission method; and
    receiving a mixture signal of the multiple preamble signals at the UE,
    wherein the multiple orthogonal training sequences comply with relations of $$\langle MD_k \rangle_N \approx \frac{(k-1)N}{K},$$

and 2≤k≤K;
    wherein, $\langle MD_k \rangle_N$ substantially approaches to $$\frac{(k-1)N}{K};$$

and N is the length of the orthogonal training sequence, $\langle \Box \rangle_N$ is the modulo-N operator, M is a positive integer parameter of the Zadoff-Chu sequence and relatively prime to N, $D_k$ is a cyclic shift, k is a positive integer, K is the number of involving base stations, and ≈ is a "relatively equal" sign indicating an approximation within a range.

2. The communication method of coordinated multi-point transmission systems as recited in claim 1, wherein the multiple orthogonal training sequences allocated to multiple base stations are a subset of a set of orthogonal training sequences in compliance with the relations.

3. The communication method of coordinated multi-point transmission systems as recited in claim 1, further comprising the steps of:
    simultaneously receiving the multiple preamble signals, which correspond to the set of orthogonal training sequences, transmitted from multiple involving base stations;
    estimating an estimated carrier frequency offset (CFO) value of a single signal according to a composite signal mixed from the multiple preamble signals, and estimating an estimated channel gain of the single signal according to the estimated CFO value;
    calculating an estimated received signal transmitted from one of the multiple base stations according to the estimated CFO values and the estimated channel gains;
    updating the estimated CFO value and the estimated channel gain corresponding to the estimated received signal transmitted by one of the multiple base stations based on the estimated received signal, and increasing an iteration number by 1; and
    terminating the updating of the estimated CFO value and the estimated channel gain if the iteration number has reached a predetermined order.

4. The communication method of coordinated multi-point transmission systems as recited in claim 3, further comprising the step of updating the estimated received signal transmitted from one of the multiple base stations according to the estimated CFO values and the estimated channel gains, which are updated, if the iteration number has not reached the predetermined order.

5. The communication method of coordinated multi-point transmission systems as recited in claim 3, further comprising the step of updating the estimated CFO value and the estimated channel gain corresponding to the estimated received signal transmitted by one of the multiple base stations based on the estimated received signal.

6. The communication method of coordinated multi-point transmission systems as recited in claim 3, wherein the predetermined order is the maximum iteration number.

7. The communication method of coordinated multi-point transmission systems as recited in claim 3, wherein a CFO estimator for updating the estimated CFO value follows:

$$\hat{w}_k^{(i+1)} = \arg\max_{w_k} \{(\hat{y}_k^{(i)})^H \Phi_k A_k A_k^H \Phi_k^H \hat{y}_k^{(i)}\};$$

wherein, i is the iteration number, k is a positive integer, $\hat{w}_k^{(i+1)}$ is an updated estimate of the estimated CFO value, $\Phi_k$ is the phase rotation matrix related to $w_k$, $A_k$ is the preamble signal matrix, H denotes the conjugate transposition operator, and the updated estimate of the received signal transmitted by one of the multiple base stations is $$\hat{y}_k^{(i)} = y - \sum_{m=1, m \neq k}^{K} \hat{\Phi}_m^{(i)} A_m \hat{h}_m^{(i)}$$

with y being the composite signal mixed from the multiple preamble signals, $\hat{\Phi}_m^{(i)}$ being the matrix by substituting $\hat{w}_m^{(i)}$ into $\Phi_m$, and $\hat{h}_m^{(i)}$ is the updated estimate of the channel gain, m is a positive integer, and K is the number of involving base stations.

8. The communication method of coordinated multi-point transmission systems as recited in claim 3, wherein an estimator for updating of the channel gain follows:

$$\hat{h}_k^{(i+1)} = (A_k^H (\hat{\Phi}_k^{(i+1)})^H \hat{y}_k^{(i)})^T / N,$$

wherein, i is the iteration number, k is a positive integer, $\hat{h}_k^{(i+1)}$ is the updated estimate of the channel gain, $A_k$ is the preamble signal matrix, N is the length of the orthogonal training sequence, $\hat{\Phi}_k^{(i+1)}$ is the matrix by substituting $\hat{w}_k^{(i+1)}$ into $\Phi_k$, H denotes the conjugate transposition operator, T denotes the matrix transposition operator, and the updated estimate of the received signal transmitted by one of the multiple base stations is $$\hat{y}_k^{(i)} = y - \sum_{m=1, m \neq k}^{K} \hat{\Phi}_m^{(i)} A_m \hat{h}_m^{(i)}$$

with y being the composite signal mixed from the multiple preamble signals, m is a positive integer, and K is the number of involving base stations.

* * * * *